United States Patent [19]

Gorgens

[11] 4,025,905
[45] May 24, 1977

[54] SYSTEM FOR ON-LINE PROCESSING OF BANKING TRANSACTIONS

[75] Inventor: Richard A. Gorgens, Bedford, Mass.

[73] Assignee: Incoterm Corporation, Wellesley Hills, Mass.

[22] Filed: Nov. 28, 1975

[21] Appl. No.: 635,894

[52] U.S. Cl. ......................................... 340/172.5
[51] Int. Cl.² ........................................ G06F 3/04
[58] Field of Search ................... 340/172.5, 149 A; 235/61.7 B

[56] References Cited

UNITED STATES PATENTS

| | | | |
|---|---|---|---|
| 3,181,124 | 4/1965 | Hammel | 340/172.5 |
| 3,308,439 | 3/1967 | Tink et al. | 340/172.5 |
| 3,341,820 | 9/1967 | Grillmeier, Jr. et al. | 340/172.5 |
| 3,407,387 | 10/1968 | Looschen et al. | 340/172.5 |
| 3,833,885 | 9/1974 | Gentile et al. | 340/149 A X |
| 3,833,888 | 9/1974 | Stafford et al. | 340/172.5 |
| 3,845,277 | 10/1974 | Voss et al. | 235/61.7 B |
| 3,937,925 | 2/1976 | Boothroyd | 235/61.7 B |
| 3,949,364 | 4/1976 | Clark et al. | 340/149 A X |

*Primary Examiner*—Melvin B. Chapnick
*Attorney, Agent, or Firm*—Kenway & Jenney

[57] ABSTRACT

A branch banking system for on-line processing of banking transactions which is responsive to customer-initiated and teller-initiated operations and comprises a plurality of remote branch office terminals and a central controller for establishing transaction validity, maintaining transaction records and customer data. Each branch office terminal includes a branch controller in communication with the central controller and an associated plurality of branch teller stations, each including a teller unit and an associated set of peripheral units. Each teller station includes a teller data display which is responsive to the central controller, by way of its associated branch controller, to display alphanumeric data representative of the transactions. The set of peripheral units includes: a PIN (Personal Identification Number) signal generator, customer operated, for generating a PIN signal representative of specific data associated with that customer, a card reader for generating a CARD signal representative of data magnetically encoded on a region of a card as the card is read, and a teller data entry terminal. Each teller data entry terminal includes a first and a second teller-operated keyboard for respectively generating a FUNCTION signal representative of a desired banking function and a NUMERIC signal representative of a desired transaction. Each teller unit includes storage for temporarily storing the PIN, CARD, FUNCTION, and NUMERIC signals as generated. Each branch controller includes means to repetitively sample the storage of each of its teller units in succession at a polling frequency at least twice the character generation rate of the various peripheral units, means to identify each sampling time when a new character has been generated since the last sampling time, and means to transfer the new character signal when a new character is identified, together with an address signal or tag representative of the associated peripheral unit to the central controller. The central controller is responsive to the succession of new character signals to identify the customer account number and desired transactions, and is further responsive to successively validate the received new character signals, establish a record of the transaction, up-date the current customer account data to reflect the transaction, and transmit an authorization signal and data representative of the transaction to the display.

6 Claims, 4 Drawing Figures

SYSTEM FOR ON-LINE PROCESSING OF BANKING TRANSACTIONS

BACKGROUND OF THE INVENTION

This invention relates to data processing systems and, more particularly, to on-line systems for processing of banking transactions.

There are many banking systems known in the art which operate in an off-line mode. Such systems typically include remote teller stations comprising data input devices for entering data representative of a desired transaction, a memory device for recording the transaction at the remote teller station and a display device for displaying data representative of the transaction. In the operation of such systems, a teller may initiate a transaction by entering appropriate data at the data input device, and data representative of the transaction is stored in the memory at the remote location. At a subsequent time, that teller station, along with other teller stations in the system, may be interrogated by a central computer in order to transfer records from the remote stations to the central computer where customer account records are maintained.

These prior art systems are subject to substantial practical limitations due to two factors. First, transactions using such systems are generally accomplished without reference to current customer account records, although in some systems, the teller may place a telephone call to the central bookkeeping office for current account information along with each transaction. Of course, in such systems there is a delay to the customer and a corresponding expense based on the teller time and telephone line costs. Alternatively, the teller at the remote station may rely on account balance data which is maintained at the remote station with relatively rare periodic updating. Accordingly, in the latter type systems, there is no positive protection of bank assets against insufficient funds to support a transaction.

The second factor is a shortcoming based on the inability to provide accurate customer verification. As a result, the banking systems in the prior art fail to provide positive protection of a bank's assets against fraud, stolen checks, lost passbooks or account run-up.

Accordingly, it is an object of the present invention to provide a banking system which operates in an on-line mode wherein each transaction is referenced to the customer's current account record.

It is another object of the present invention to provide an on-line banking system which provides accurate customer verification.

It is a further object of the present invention to provide an on-line banking system having positive protection of a bank draft against fraud, stolen checks, lost passbooks, account run-up and insufficient funds to support a transaction.

SUMMARY OF THE INVENTION

According to the present invention, a plurality of remote branch office terminals are maintained in communication with a central controller at a central office via data communication lines. Each of the branch office terminals includes a branch controller and a plurality of branch teller stations. Each branch teller station includes a teller unit and an associated set of activatable peripheral units, and may also include an alphanumeric teller data display for displaying data representative of the transactions. The peripheral units are connected by way of an associated multiple bit data channel to the teller unit. Each peripheral unit is characterized by having a minimum period during which data is maintained on its associated data channel after activation.

In one form of the invention, the set of peripheral units associated with each teller unit includes a PIN signal generator for generating on its associated data channel a signal representative of a specific data word (personal identification number) associated with that customer, a card reader for generating on its associated data channel a CARD signal respresentative of a data word magnetically encoded on the region of a card as the card is manually driven past a sensing head in the card reader, and a teller data entry terminal. The teller data entry terminal includes two keyboards for generating signals on its associated data channel: the first signal being FUNCTION signal representative of a desired banking function, and the second signal being a NUMERIC signal representative of the desired transaction.

Each teller unit includes an output register storage means and a switching network. The switching network is operative when the register is empty to connect in sequence the next peripheral unit data channel having data therein to the output register. The output register includes at least two excess bit positions for providing tag data which is indicative of the particular peripheral unit currently connected to the register.

Each branch controller includes means to repetitively read out, or poll the output register storage means of each of its teller units in succession at a sufficiently rapid polling frequency so that the entire polling period for all the teller units is less than the minimum period for insertion of data from one of the peripheral units. The branch controller further includes means to identify each sampling time when a new character has been generated since the last sampling time, and means to transfer the new character signal at such times when a new character is identified together with tag data representative of the associated peripheral unit to the central controller. The central controller is responsive to the succession of new character signals to identify the customer account number and the desired transaction.

The central controller is further responsive to successively validate the received new character signals, establish a record of the transaction, up-date the current customer account data to reflect the transaction and transmit an authorization signal and data representative of the transaction to the display.

In this configuration, the operator of each teller station has access to central office transaction verification and customer identification means, and also to on-line memo posting files at the central office which provide up-to-the-minute balance and status file information for customer accounts. As a result, operators at each of the plurality of teller stations throughout the system may perform substantially simultaneous transactions, none of which require any operator to leave the actual teller station, promoting increased cash drawer security.

Furthermore, by utilizing the central office controller to perform customer verification operations for each transaction (by comparing a personal identification number (PIN) together with a magnetically encoded account number associated with a customer supplied identification card), a positive protection is achieved against transactions supported by insufficient fund, fraud, stolen checks, lost passbooks and account run-up. Further, with this configuration, a transaction log file may also be provided by the central controller and a report on each such file may be generated at each teller station to provide an audit trail of all teller activity and further provide a basis for bank management reports.

BRIEF DESCRIPTION OF THE DRAWINGS

The foregoing and other objects of the invention the various features thereof, as well as the invention itself, may be more fully understood from the following description, when read together with the accompanying drawings in which.

DESCRIPTION OF THE PREFERRED EMBODIMENT

Figure 1:
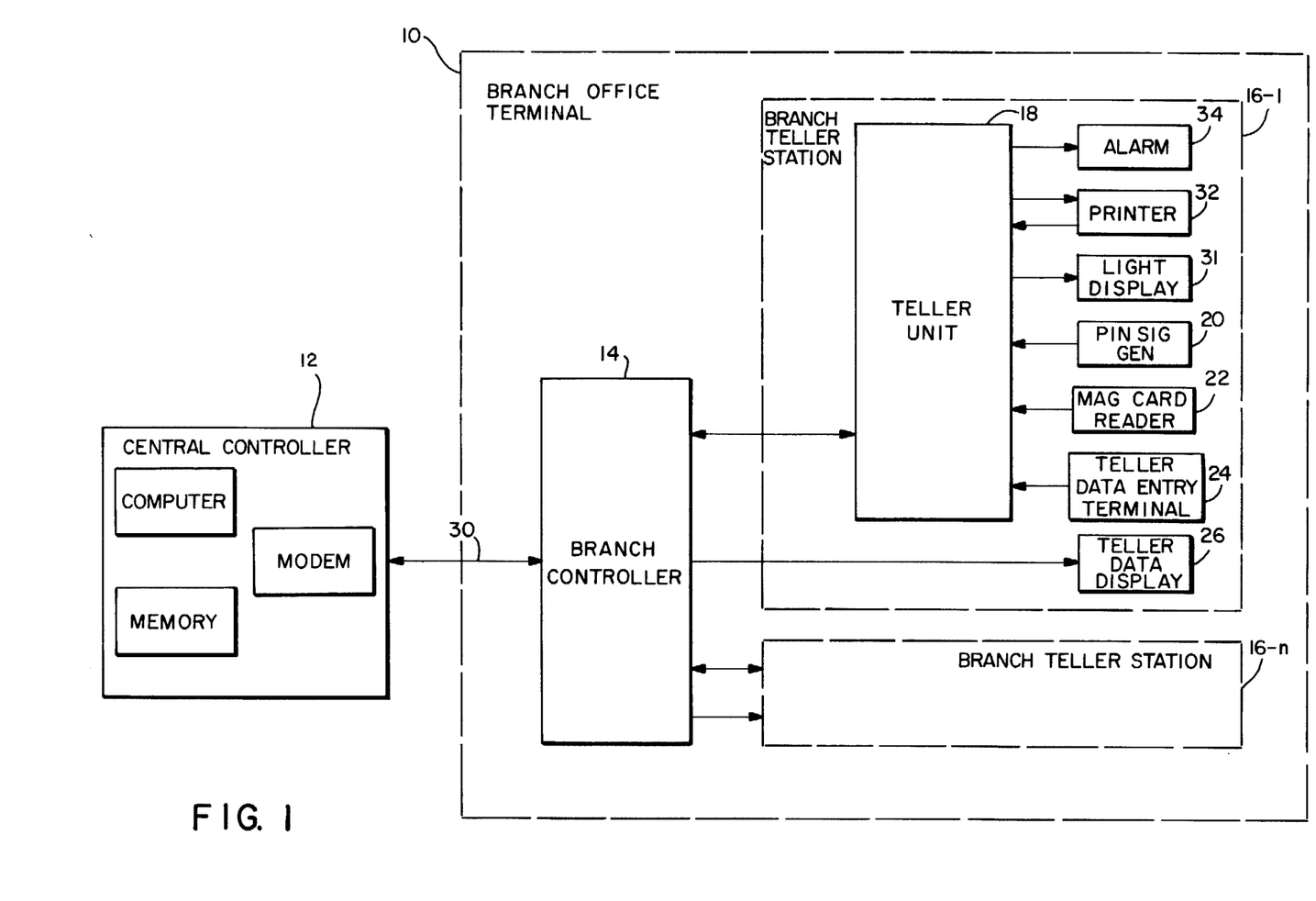
FIG. 1 shows, in block diagram form, an exemplary branch banking system in accordance with the present invention.

FIG. 1 shows in block diagram form an exemplary branch banking system including branch office terminal 10 interconnected with central controller 12 at a central bank office. Branch office terminal 10 includes a branch controller 14 and one or more substantially similar branch teller stations as represented by teller stations 16-1 and 16-n in FIG. 1. Station 16-1 includes a teller unit 18, a plurality of associated peripheral units including PIN signal generator 20, magnetic stripe card reader 22, and teller data entry terminal 24, and teller data display 26. Branch controller 14 is coupled by a two-way communication path 30 and suitable modems to a central computer and associated memory at the central controller 12 at the bank central office. Branch controller 14 is further coupled by a two-way communication path to the teller units and by a one-way communication path to the displays in each of the branch teller stations. Teller unit 18 is interconnected via a one-way communication from PIN signal generator 20, from card reader 22, and from data entry terminal 24. As noted below, alternatively configured teller stations may also be utilized.

In the present embodiment, PIN signal generator 20 includes a keypad arranged with 10 numeric keys. Generator 20 is used in conjunction with card reader 22 to establish positive customer identification prior to a transaction. This identification is initiated by the customer's keying of a memorized multiple-digit code word denoted as the Personal Identification Number (PIN). In response to the keying of each digit, the generator 20 produces a four bit PIN data signal and a PIN strobe signal, and applies these signals to the teller unit 18 for transmission to the computer.

Magnetic stripe card reader 22 comprises an apparatus for receiving and reading a manually inserted magnetic encoded card, for example, encoded using the ABA (American Banking Association) and IATA (International Air Transport Association) standard tracks. The card reader includes a guide means for directing the card as manually inserted past a magnetic reading head. The card reader 20 may utilize any of the well-known techniques for detecting, identifying magnetically encoded characters and generating a multiple character CARD signal. As each character in the card's magnetic data field passes the head, reader 22 produces a multiple bit card data signal and a card data change signal, and applies these signals to teller unit 18 for transmission to the computer. As noted in more detail below, the multiple character CARD signal generated by card reader 22 is subsequently compared with the customer generated PIN signal at the central office for use in customer identification. In the present embodiment, the card reader 22 is operated by the teller, thereby enhancing the overall system security by permitting the retrieval of a card which may be altered or fraudently presented.

The teller data entry terminal 24 of the present embodiment includes a keyboard having 18 programmable function keys, each of which may be manually activated by the teller to generate a five bit FUNCTION signal and associated FUNCTION strobe signal. The FUNCTION signal may be representative of a desired banking function, for example, money order purchase, installment loan payment, credit card payment, commercial loan payment, traveler check purchase, federal/bank drafts, cashier check purchase. Of course, the function keys may be selectively assigned any one of such functions or alternative banking functions, depending on the particular needs of the bank. In other embodiments, keyboards having a different number of keys (and correspondingly different bit length signals) and the same or different functions may be used. The terminal 24 also includes a keyboard having 12 numeric keys, each of which may be manually operated by the teller to generate a five bit NUMERIC signal and associated NUMERIC strobe signal. The NUMERIC signal may be representative of the amount of money in a desired transaction, for example. The FUNCTION data and strobe signals and the NUMERIC data and strobe signals are applied to the teller unit 18 for transmission to the computer.

The teller data display 26 includes in the present embodiment a small screen alphanumeric CRT display which may display 12 lines of alphanumeric information with 40 characters per line, with high and low screen intensity and character blink for special emphasis. Of course, in other embodiments, differing displays may be used.

The set of peripheral units associated with teller unit 18 in the embodiment of FIG. 1 also includes light display 31, printer 32 and alarm 34, which are coupled as indicated to teller unit 18. Light display 31 includes a plurality of indicator lights which provide status information to either the customer or teller station operator in response to commands originating from the central office controller. By way of example, the present embodiment includes six lamps associated with the teller data entry terminal 24 and two lamps associated with the PIN signal generator 20. The lamps associated with terminal 24 provide the following status information to the teller station operator, respectively: indicates when the branch office terminal 10 is operating in an on-line mode; indicates when terminal 10 is operatig in an off-line mode; indicates when printer 22 is "ready"; indicates when the PIN signal generator 20 keypad is "ready"; indicates when the central controller requests the re-entry of a bank card in the magnetic card reader (for example, when the validity comparison might indicate that incorrect PIN was entered by the customer); and indicates when there is a message waiting for the teller at the teller data display 26. The two lamps associated with generator 20 provide the following status information: indicates when the computer requests the customer to enter and re-enter his PIN number, respectively. Of course, the above-noted functions for the lamps of light display 31 are merely exemplary and in other embodiments, additional or alternative lamps may be utilized for the same or different functions depending on the desired status information which is to be available to the teller and customer.

The printer 32 in the present embodiment is configured to print a forty character line, at one print line per second, at the rate of 1200 characters per minute, in response to print data supplied from the central controller by way of the branch controller and teller unit 18 (and a print data buffer therein). The printer 32 also provides signals to the central controller which are representative of the printer status and indicative of a change in printer status. The printer status and status change signals are applied to teller unit 18 for transmission to the computer. Of course, in other embodiments, alternative printers may be utilized. Printer 32 may provide a transaction receipt for the customer, or an activity journal for the teller station operator.

The alarm 34 provides a means for generating an audible alarm signal to the teller station operator in response to a command signal from the central controller.

It will be understood that in the present embodiment, the light display 31, printer 32 and alarm 34 provide further security enhancing improvements to the described branch teller station, and that some embodiments of this invention do not include these functions.

Figure 2:
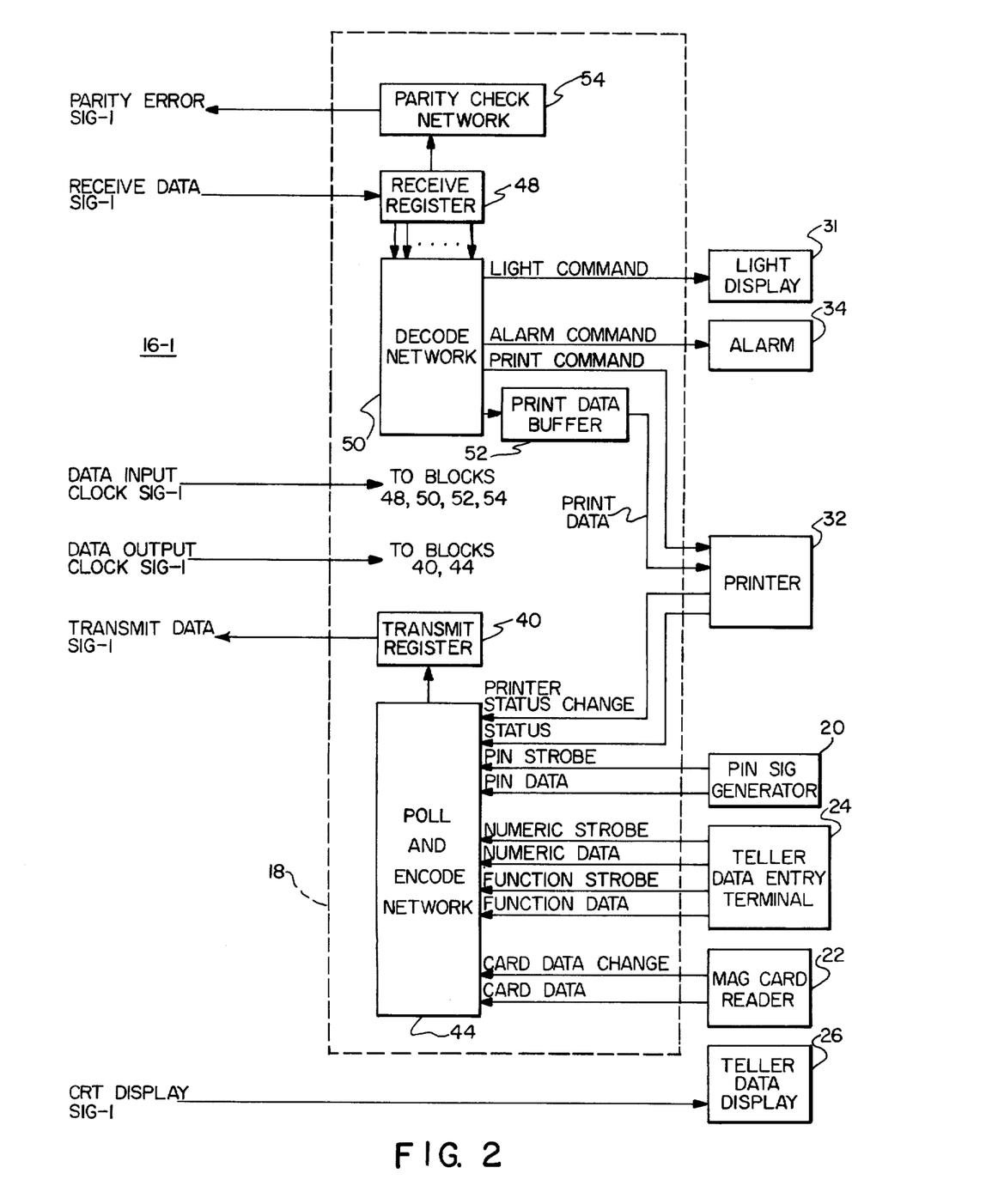
FIG. 2 shows, in detailed block diagram form, a branch teller station of the embodiment of FIG. 1.

FIG. 2 shows a detailed block diagram of branch teller station 16-1. As shown, the CRT display signal is applied in video form directly from branch controller 14 to the teller data display 26. In addition, the teller unit 18 includes transmit register 40, poll and encode network 44, receive register 48, decode network 50, print data buffer 52, and parity check network 54. Generator 20, reader 22, teller data entry terminal 24 and printer 32 provide the following signals to poll and encode network 44: PIN data and strobe signals, CARD data and data change signals, FUNCTION and NUMERIC data and strobe signals, and printer status and status change signals, respectively. Register 40 and network 44 each receive a data output clock signal from branch controller 14. In response thereto, register 40 and network 44 determine if a new character has been generated by the peripheral units 20, 22, 24 or 32 since the last data output clock signal. If so, register 40 provides a 10 bit transmit data signal (nine bits data, one bit parity) which is applied to branch controller 14. The operation of register 40 and network 44 are described more fully below in conjunction with FIG. 4.

The receive register 48 receives a 10 bit receive data signal (nine bits data, one bit parity) from branch controller 14. The receive data signal is accompanied by a data input clock signal comprising a 10 pulse burst which is applied from branch controller 14 to blocks 48, 50, 52 and 54.

In operation, the 10 bit receive data signal is loaded into register 48 and under control of the data input clock signal. The parity check network 54 determines from the signal stored in register 48 whether there has been a parity error and if so, generates a parity error signal which is returned to branch controller 14. The decode network 50 demultiplexes the data in register 48 respectively to form an alarm command signal for alarm 34, a print command signal for printer 32, print data (which is applied to printer 32 by way of the printer buffer 52) and light command signal for light display 31.

Figure 3:
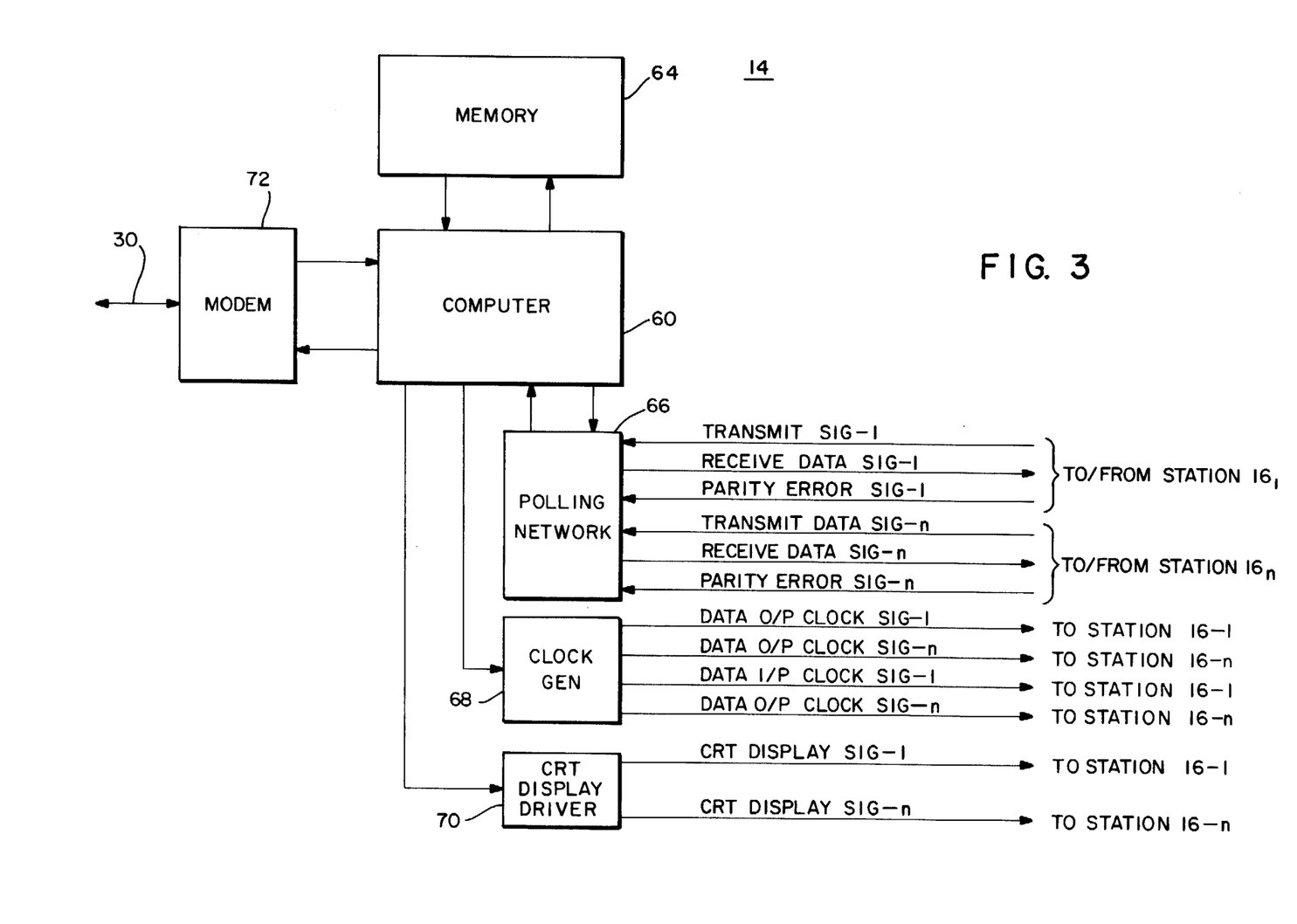
FIG. 3 shows, in detailed block diagram form, the branch controller of the embodiment of FIG. 1.

FIG. 3 shows the branch controller 14 in detailed block diagram form. That controller comprises computer 60 and associated memory 64, polling network 66, clock generator 68, CRT display driver 70, and modem 72. It will be understood that in the present embodiment, computer 60 comprise a dedicated minicomputer element 64 comprises a main memory expandable to 32K bytes of non-volatile read/write, random access controller storage, together with a diskette storage providing random access mass storage. The computer 60 is interfaced with the central office controller by way of a suitable modem 72 and communication path 30.

The polling network 66 is controlled by the computer 60 to serially transfer to, and receive from, each of the connected teller stations transmit data signals, receive data signals, and parity error signals. These data transfers are accomplished serially over independent lines. Clock generator 68 is controlled by computer 60 to serially provide 10 bit command (data input) and interrogate (data output) clock pulse burst over separate lines to each of the teller stations connected to polling networks 66. The CRT display driver 70 is controlled by computer 60 to generate and apply the appropriate CRT display signals (in video form) via separate lines to each of the CRT displays associated with the teller stations connected to polling network 66.

In operation, the polling network interrogates each of the teller stations attached thereto at a rate at least twice the new character generation rate achieved by the peripheral units 20, 22, 24 and 32 connected to teller unit 18. In this manner, the computer 60 ensures that no data is lost during the periods between sampling times. Data received by the pollin network 66 is then converted to suitable form (including a signal having an address portion identifying the originating peripheral unit) for transmission via modem 72 to the computer of the central office controller 12.

Polling network 66 further includes means for identifying an address portion (representative of an intended teller station) of signals received from the central controller 12 and means for routing such signals to the appropriate teller station, thereby providing alarm and light and print command signals and print data signals in appropriately multiplexed form to the various teller stations connected thereto.

Figure 4:
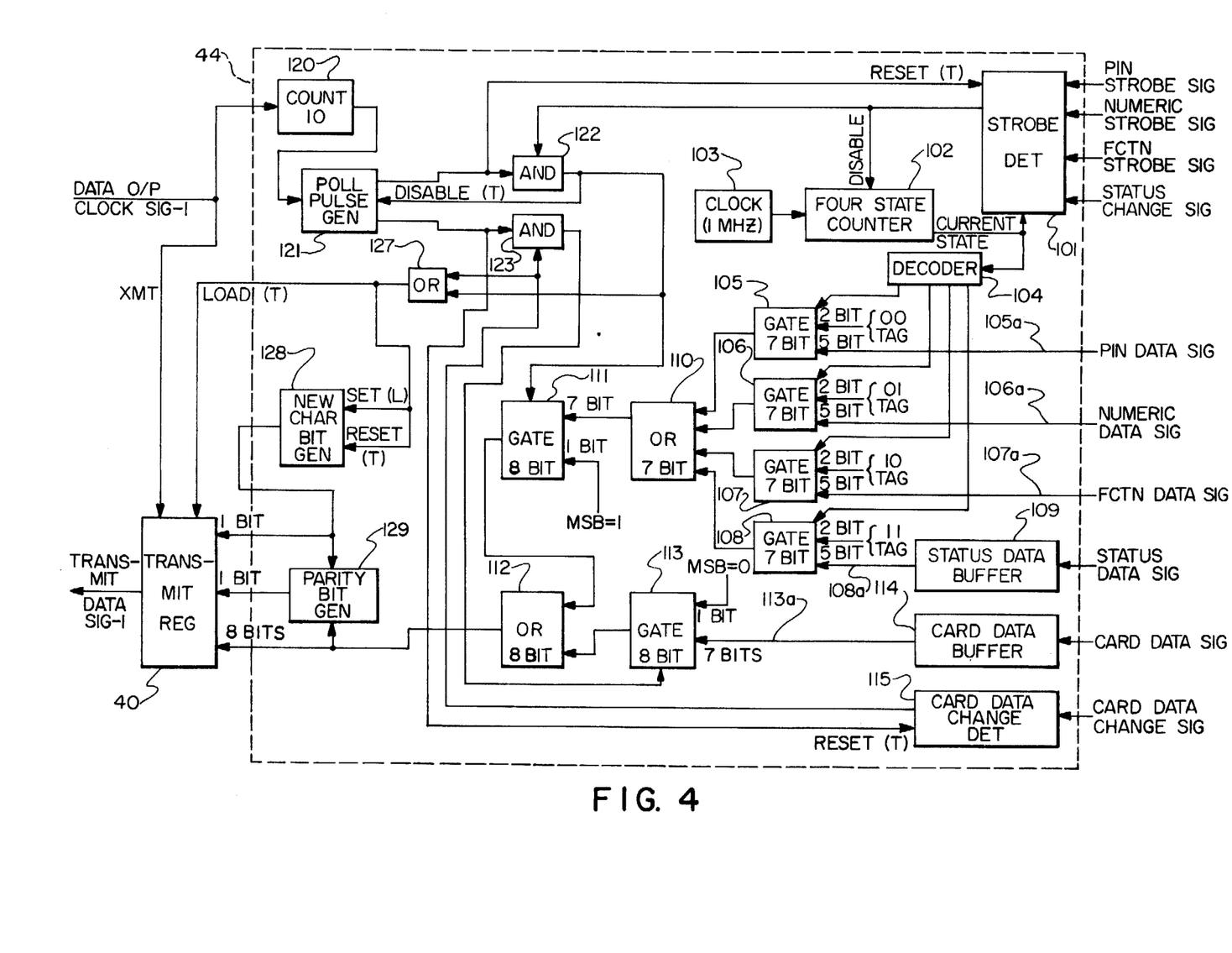
FIG. 4 shows, in detailed block diagram form, the poll and encode network of the embodiment of FIG. 2.

The transmit resistor 40 and poll and encode network 44 are shown in detailed form in FIG. 4. Network 44 includes a means for generating a ten bit transmit data signal word in response to an applied data output clock signal pulse burst when a character or status word not previously transmitted is available. The 10 bit word includes one parity bit, one new character bit (for identifying the data portion of the word as being different from the corresponding word associated with a previous data output clock signal pulse burst), and an eight bit data portion representative of a new character from one of card reader 22, terminal 24 and PIN signal generator 20, or a new printer status word from printer 32. The eight bit data portion includes a binary 0 identifier portion as the most significant bit (MSB) for a card reader 22 character, and includes a binary 1 identifier portion as the MSB for a PIN, NUMERIC, or FUNCTION character, or printer status word. For a PIN, NUMERIC or FUNCTION character or a printer status word, the next two MSB's form a tag portion 00, 01, 10, or 11, respectively, for identifying the originating peripheral unit for the remaining five bits in the eight bit data portion. Of course, for other embodiments, differing tags and identifier bit definitions may be utilized. Furthermore, since only new characters or status words are transmitted, the new character bit represents redundant information and accordingly, in alternative embodiments, may be omitted from the transmit data signal.

For the illustrated embodiment, the poll and encode network in register 40 function in the following manner. In the event the contents of register 40 are representative of data generated by one of peripheral units 20, 22, 24 and 32 which has not yet been transmitted to branch controller 14, the ten pulse burst forming a data output clock signal is first utilized to serially transmit the contents of transmit register 40 to the polling network 66 of branch controller 14. In the present embodiment, register 40 includes means to gate the data output clock signal to read out the register 40 contents only if the new character bit indicates that the contents are representative of character data not previously transmitted to controller 14. In alternative embodiments, the new character bit may not be transmitted with the transmit data signal since only new character data is transmitted. For such an embodiment, the transmit data signal may comprise an eight bit data portion and the parity check bit.

Following the transmission of the register 40 contents, or, if no data had been awaiting transmission, network 44 determines whether there has been a new PIN, NUMERIC, or FUNCTION character or new printer status since the last data ouput clock signal. If so, the corresponding five bit data portion, the appropriate two bit tag portion and single bit identifier portion are generated and entered into register 40 together with a new character bit and parity bit. The resultant 10 bit word is stored in register 40 to await transmission to network 66 in response to the next data ouput clock signal.

In the event that none of the PIN, NUMERIC or FUNCTION character and printer status data signals have changed since the last data output clock signal, network 44 then determines whether there is card data from reader 22 awaiting transmission to the polling network 66. If so, then a corresponding seven bit card data portion and single bit identifier portion are generated and entered into transmit register 40 together with new character bit and parity bit. The resultant then bit word is stored in register 40 to await transmission to polling network 66 in response to the next data output clock signal.

The eight bit data portion entered into register 40 including tag 3 and identifier portions) is generated by blocks 101–115 shown in FIG. 4. The clock generator 103 applies a clock signal (e.g. 1MHz in this embodiment) to four state counter 102 which changes state at corresponding rate, except when a disable signal is applied from strobe detector 101. The state of counter 102 is decoded by decoder 104 so that the signals representative of the various states of counter 102 activate associated ones of gates 105–108, thereby establishing a polling of the PIN, NUMERIC, FUNCTION and status lines. In response to the activation by the user of PIN signal generator 20, or by the teller of data entry terminal 24, or a change in status at printer 32, a strobe or status change signal is applied to detector 101 to indicate that an associated five bit data signal on one of the input lines to 105a–108a of gates 105–108, respectively, is ready for transmission. In response to the first received strobe or status change signal, detector 101 prevents further incrementing of counter 102, and the thencurrent state of that counter is decoded by decoder 104 to activate a corresponding one of gates 105–108. As a result, the seven bit output of the OR gate 110 includes the two bit tag associated with the activated one of gates 105–108, plus the associated five bit data signal on the corresponding one of lines 105a–108a. This seven bit signal is applied to gate 111 together with a single identifier bit (MSB = 1) for identifying that the seven bit signal is from the PIN, NUMERIC, FUNCTION, and printer status signal lines. Eight bit gate 111 may be activated by a first poll pulse as described more fully below, to apply the eight bit signal to OR gate 112 and, in turn, to the input of transmit register 40. It will be understood that following transmission, detector 101 is reset by the trailing edge of the first poll signal, thereby removing the disable signal from counter 102, permitting clock 103 to again increment counter 102 until the next strobe or printer status change signal is received by detector 101. The network 44 is interrogated by the data output clock signal at a sufficiently high rate relative to the duration of PIN, NUMERIC, or FUNCTION strobe signals (and associated data signals) so that the successive polling of the input lines 105a–108a is accomplished for all data applied even though the signals on those lines may overlap in time. Furthermore, in the present embodiment, the status data from the printer is passed through a status data buffer 109 thereby preventing loss of any status information while servicing any of the PIN, NUMERIC, and FUNCTION signal lines.

In a similar manner, the seven bit card data signal from card reader 22 is passed by way of a card data buffer 114 and line 113a to an eight bit gate 113 which has, as an additional input, a one bit identifier for identifying the gate 113 output signal as card data (MSB = 1). Gate 113 may be activated by a second poll pulse as described more fully below to apply the eight bit signal to OR gate 112 and, in turn, to register 40. In addition, the card data change signal is applied to card data change detector 115 to provide an output signal identifying times when a new card data character is stored for transmission in card data buffer 114. In a manner similar to strobe detector 101, the card data change detector 115 is reset by the trailing edge of the second poll pulse following the transmission of a new card data character.

Network 44 further includes a means for generating the appropriate first and second poll pulses for application to the activating inputs of gates 111 and 113. In the illustrated embodiment, a ten state counter 120 detects when the last bit is transferred from register 40 (i.e. following the tenth pulse in the data output clock signal) and in response thereto initiates the action of poll pulse generator 121. Poll pulse generator 121 provides a first poll pulse to AND gate 122. A second input to gate 122 is provided from the strobe detector 101 so that when detector 101 indicates that a strobe or status change signal has been received since the last polling of the associated one of lines 105a–108a, the first poll pulse is transferred through gate 122 and applied directly to gate 111 to pass that eight bit word as noted above to the transmit register 40. Furthermore, the trailing edge of that poll pulse resets the strobe detector 101 (enabling the renewed incrementing of counter 102) and returns generator 121 to its initial state (awaiting the tenth pulse of the next data output clock signal).

In the event that detector 101 indicates that no strobe or status change signal has been received since the last polling of any of lines 105a–108a, and that, consequently, the first poll pulse is not passed by gate 122, the poll pulse generator 121 then generates a second poll pulse which is applied to AND gate 123. Gate 123 has a further input from the card data change detector 115 and passes the second poll pulse in the event that detector 115 indicates that there is card data in buffer 114 which is available for transmission. The second poll pulse is passed by gate 123 and applied directly to gate 113 which passes the eight bit signal at its input by way of gate 112 to transmit register 40. Of course, in the event gate 122 was activated by detector 101 to pass the first poll pulse, the poll pulse generator 121 is disabled (i.e. returned to its initial state) by the trailing edge of the first poll pulse and the second poll pulse is not generated during the particular interrogation cycle initiated by the data output clock signal.

OR gate 127 provides a loading signal for the transmit register 40 in response to either of the poll pulses as passed by gates 122 and 123. In the present embodiment, the trailing edge of any pulse passed by gate 127 is effective to load register 40. Furthermore, the leading edge of the pulse is used to set the new character bit generator 128, thereby establishing a binary one for loading into register 40 (indicating that the eight bit input to register 40 is representative of a new character, i.e. one which has not been transmitted in response to a previous data output clock signal). In addition, the parity bit generator 129 determines from the output of generator 128 and the output of OR gate 112 whether or not a binary one or zero must be added to maintain a parity check for the transmit data signal. The new character and parity check bits are loaded into register 40 at the same time as the eight bit word from gate 112.

Accordingly, in this mode of operation, an interrogation of the peripheral units associated with a teller unit is accomplished in response to the data output clock signal burst, with the transmit data signal including tag portions which refer back to the originating peripheral unit. It will be understood that the data output clock signal is applied at sufficiently short intervals so that no data is lost. For example, the successive data output clock signals may be applied at twice the maximum character generation rate of the various peripheral units. Furthermore, it will be noted that the counter 102 establishes a successive polling of the PIN, NUMERIC, FUNCTION and printer status signal lines 105a–108a in between the interrogation clock signals until a new character signal is identified on one of those lines. As a result, new data on one of those lines is accorded a priority status with respect to the buffered card data in the transmission of signals to the polling network 66.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A branch banking system for on-line processing of banking transactions comprising:
   A. a central controller for maintaining transaction records and customer account data,
   B. a plurality of remote branch controllers, each of said branch controllers being coupled by a communication channel to said central controller,
   C. a plurality of branch teller stations associated with and coupled to each branch controller, each branch teller station including a teller unit having an associated set of activatably peripheral units, each of said peripheral units being connected through an associated multiple bit data channel to said teller unit and being characterized by having a minimum period during which single character data is inserted on said associated data channel after any activation of said peripheral unit, said teller unit including;
      i. an output register and a switching network connecting each of the peripheral unit multiple bit data channels to said output register, said output register having at least two excess bit positions more than the maximum number of bits in any of said data channels, and
      ii. means for operating said switching network to sequentially connect each of said peripheral unit multiple bit data channels having data therein to said output register, and for providing in said excess bit positions in said output register, information indicating which of said peripheral unit data channels is connected, and further for operating said switching network to couple the next sequential peripheral unit data channel having data therein to the output register only when said output register is empty, wherein each of said branch controllers includes means for continuously polling in a predetermined sequence its associated teller units for uniform polling periods to read out the single character data in said output registers of each of said teller units, the frequency of polling being sufficiently high so that the composite polling period for all of the associated teller units is less than said minimum period for insertion of said single character dta from one of said peripheral units.

2. A banking system in accordance with claim 1 wherein said means for operating the switching network concepts each of the peripheral unit multiple bit data channels in a predetermined sequence to said output register and wherein said operating means provides information in bit form to said output register excess bit positions corresponding to the sequential position of the switching networks as indicative of the peripheral unit being connected.

3. A banking system in accordance with claim 1 wherein said branch controller polling means provides to each teller unit a polling signal wherein said polling signal actuates said output register to transmit all of the information stored therein to its associated branch controller whenever the information stored therein differs from that which was stored at the last previous polling of that teller unit, and wherein the termination of said polling signal is used as an input to said means for operating the switching network to cause said switching network to switch to the next sequential one of said peripheral unit multiple bit data channels.

4. A banking system in accordance with claim 1 wherein said activatable peripheral units include, a personal identification number (PIN) signal generating means for generating a multiple bit PIN signal in response to a manual operation performed by a customer, a teller data entry means including a function data means for generating a multiple character function signal in response to a manual operation performed by a teller, said function signal being representative of a desired banking function, and further including a numeric data means for generating a numeric signal in response to a manual operation performed by said teller, said numeric signal being representative of a desired transaction.

5. A branch banking system in accordance with claim 4 wherein said activatable peripheral units include an encoded card reader for generating a multiple character card signal as an encoded portion of an inserted card is manually driven past a reference point of said reader, said card signal being representative of a data word encoded on said portion, said card reader including buffer storage means for temporarily storing the last read card information, and where said operating means sequentially connects each of said peripheral unit multiple bit data channels having data therein to said output register other than said card reader, prior to connecting said card reader data channel to said output register.

6. A branch banking system for on-line processing of banking transactions, said system being responsive to customer-initiated and teller-initiated operations, comprising:

A. a central controller for maintaining transaction records and customer account data, B. a plurality of remote branch controllers, each of said branch controllers being coupled by an associated communication channel to said central controller, C. a plurality of branch teller stations associated with and coupled to each branch controller, each branch teller station including a teller unit having an associated set of peripheral units, and a teller data display, said set including:

i. a personal identification number (PIN) signal generating means for generating a multiple character PIN signal in response to a manual operation performed by said customer, said PIN signal being representative of a predetermined data word associated with a customer, ii. a magnetic stripe card reader for generating a multiple character CARD signal as an inserted card is manually driven past a reference point in said reader, said CARD signal being representative of a data word magnetically encoded on a region of a card, iii. teller data entry means including a function data means for generating a multiple character FUNCTION signal in response to a manual operation performed by said teller, said FUNCTION signal being representative of a desired banking function, and further including a numeric data means for generating a NUMERIC signal in response to a manual operation performed by said teller, said NUMERIC SIGNAL BEING REPRESENTATIVE of a desired transaction, said teller unit including storage means for temporarily storing said PIN, CARD, FUNCTION and NUMERIC signals, and said teller data display including means responsive to said central controller by way of its associated branch controller to display alphanumeric data representative of said transaction, and wherein each of said branch controllers includes means to repetitively sample the storage means in each of its associated teller units in succession at a sampling frequency at least twice the character generation rate of said peripheral units, and means to identify at each sampling time when a signal representative of a new character has been generated since the last sampling time for each of said peripheral units, and, at such times when a new character is identified, to successively transfer said new character signals together with an address signal representative of said peripheral unit to said central controller, and wherein said central controller includes means responsive to the succession of said new character signals to identify the customer account and desired transactions associated therewith, validate said character signals, establish a record of said transaction, update the current customer account data to reflect said transaction, and transmit an authorization signal and display data representative of said transaction to said display associated with the transaction originating teller station.

* * * * *